(No Model.) 2 Sheets—Sheet 1.
C. R. GORRINGE.
AUTOMATIC WEIGHING MACHINE.
No. 536,334. Patented Mar. 26, 1895.
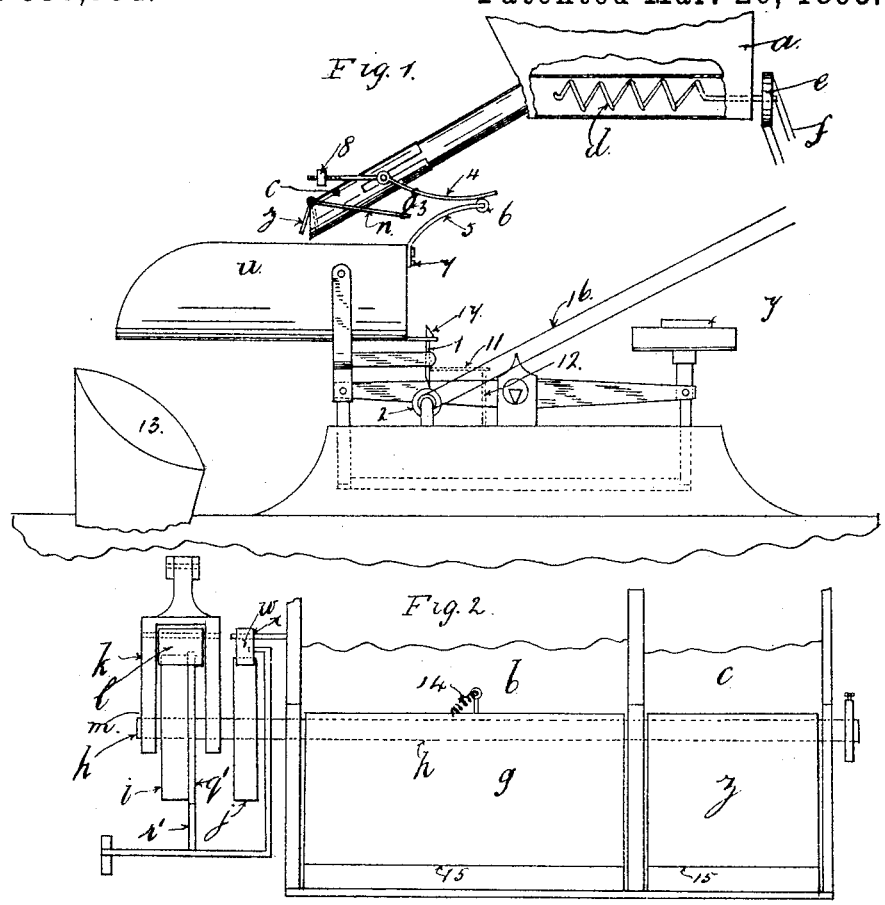
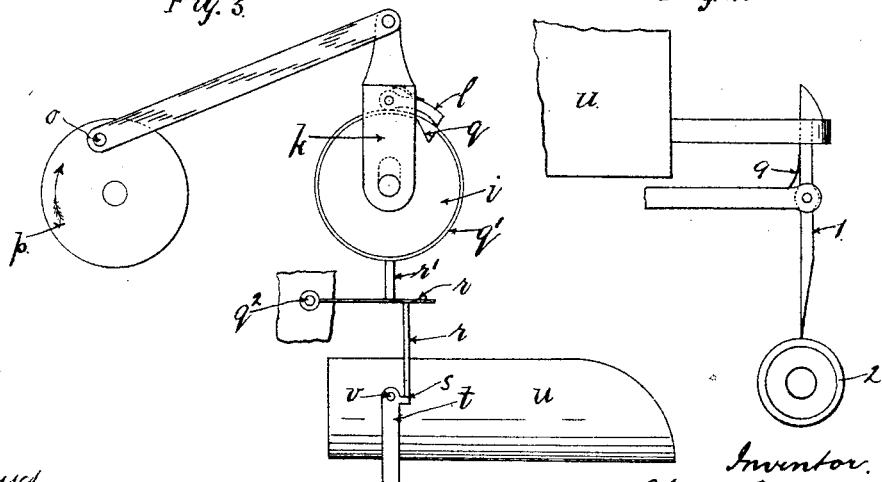
Witnesses:
Benjamin Clark.
A. Grilliell.
Inventor.
Charles Richard Gorringe
per E. Eaton,
His Attorney
THE NORRIS PETERS CO., PHOTO-LITHO., WASHINGTON, D. C.

(No Model.) 2 Sheets—Sheet 2.
C. R. GORRINGE.
AUTOMATIC WEIGHING MACHINE.
No. 536,334. Patented Mar. 26, 1895.
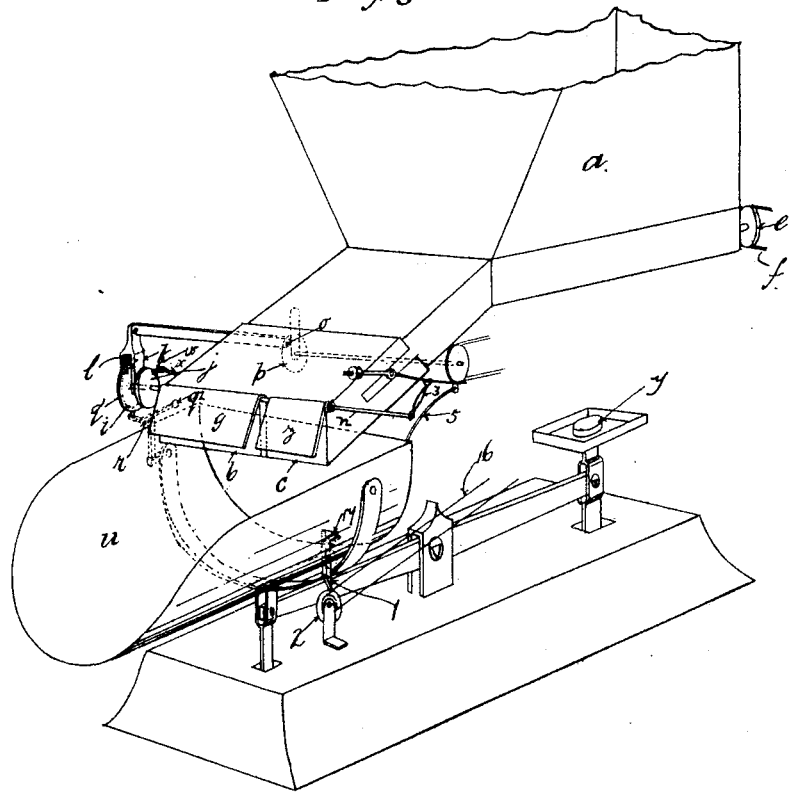

UNITED STATES PATENT OFFICE.

CHARLES R. GORRINGE, OF LONDON, ENGLAND.

AUTOMATIC WEIGHING-MACHINE.

SPECIFICATION forming part of Letters Patent No. 536,334, dated March 26, 1895.

Application filed February 14, 1894. Serial No. 500,185. (No model.)

*To all whom it may concern:*

Be it known that I, CHARLES RICHARD GORRINGE, a subject of the Queen of Great Britain, and a resident of Hornsey, London, in the county of Middlesex, England, have invented certain new and useful Improvements in Automatic Weighing-Machines, of which the following is a full, clear, and exact specification thereof.

This invention relates to automatic scale weighing machines and aims to provide a machine or scale which will weigh and deliver a predetermined quantity of a substance such as tea, sugar or the like which is supplied from a hopper.

The improvement consists of the novel features which will be hereinafter more fully described and claimed and which are shown in the annexed drawings, in which—

Figure 1 is a side elevation partly in section of a scale weighing machine constructed according to my invention; Fig. 2, a front elevation to enlarged scale showing my arrangement of shutters; Fig. 3, an enlarged view of ratchet wheel for closing shutter; Fig. 4, a detached view of clip mechanism for releasing the tilting scale pan; Fig. 5, a perspective view showing my invention, part of the hopper being cut away.

Referring to Fig. 1 $a$ is the hopper containing the substance to be weighed which is conveyed to the chutes $b$ and $c$ by means of worm feeders $d$. The feeder may consist of a helical spring or spiral which is rotated by being connected to the motive power by the pulley $e$ and strap or belt $f$. I find it most convenient to employ two chutes the one being larger than the other. The larger chute $b$ is closed by a shutter $g$ carried upon and moved by the spindle $h$. To this spindle $h$ are attached two wheels or disks $i$ and $j$. The arm $k$ carrying the pawl $l$ is pivoted at $m$ to the spindle $h$ which in turn is pivotally attached to the crank pin $o$ on the wheel $p$. When the wheel $p$ is rotated the pawl $l$ is caused to move to and fro, but is prevented from engaging in a notch $q$ in the disk or wheel $i$ by bearing on the slotted plate $q'$ which rests upon the lever $r$, and is pivoted at $q^2$ to the frame work of the machine. The lever $r$ is attached at $s$ to the frame $t$ to which the scale pan $u$ is pivoted at $v$. The pawl $w$ is pivoted at $x$ to the chute $b$ or framework. The scale pan $u$ is weighted or balanced so as to return to its initial position after the substance has been delivered from same.

The action is as follows: When the desired amount of substance has entered the scale pan so as to counterbalance the weight $y$ the scale pan descends, and the slotted plate falls and allows the pawl $l$ to engage on the slotted wheel $i$ and thus close the shutter $g$ a pawl $w$ entering a slot on the second disk or wheel $j$. The final amount of substance is now delivered from the smaller chute $c$ until the descent of the scale pan brings the end of catch piece 1 in contact with the small wheel 2 having an india rubber serrated edge which moves the catch piece and releases the scale pan $u$ which now tilts and in doing so closes the smaller shutter $z$ through the lever $r$ and is connected by an elastic band or spring 3 to the pivoted lever or rod 4 which is raised by the bent arm 5 carrying a small friction roller 6 said bent arm being secured to the scale pan $u$ at 7. The lever 4 has a weight or ball 8 which travels along same and by its position regulates the relase of the scale owing to the weight exerted by same on the arm of the scale pan $u$ and so alters the moment of release of same.

The catch piece which holds the scale pan in position may be controlled by a small spring or such like 9. If desired the catch piece 1 may have an arm 11 which is shown in dotted lines and which comes in contact with the stop piece 12 and so releases the catch piece. The substance when the scale pan tilts is deposited into the chute 13 and the scale pan $u$ returns to its initial position and as it rises opens the shutters by the lever $r$ which releases the pawl $w$ from the second slotted wheel $j$.

A spring 14 or its equivalent may be employed to open the shutter $g$. The edges 15 of the shutters $g$ and $z$ have india rubber or flexible edges. The small serrated wheel is revolved by the band 16 also the wheel 2 and feeder $d$ by any suitable motive power. The pawls $l$ and $w$ may be controlled by springs if desired. The catch piece has an inclined surface to allow the scale pan to return to its locked position through the medium of the loop $1^7$.

Having thus described my invention, what I desire to secure and claim by Letters Patent is—

In automatic scale weighing machines in combination, a tilting scale pan a catch piece for releasing and holding said scale pan, a rotating serrated wheel, a stop piece for releasing said catch piece when the scale pan descends a large chute, a door or shutter, closing said chute, through the medium of a rocking pawl which is operated by an eccentric, said pawl acting upon a ratchet wheel attached to the spindle carrying the larger shutter, a disk or bearing surface actuated by a lever attached to the scale pan and which allows the rocking pawl to come into contact with the ratchet wheel when the scale pan descends, a slotted disk attached to the spindle carrying said shutter, a pawl engaging in same when in its closed position, a smaller chute closed by a door or shutter to which is attached a lever connected to a pivoted arm by an elastic cord upon one end of which a weight or counterpoise travels, a rod attached to said scale pan and closing the smaller chute by engaging with a pivoted lever when the scale pan tilts, flexible edges attached to said shutters, a hopper containing the substance which is fed to the chutes, a feeder or worm formed of a bent blade or helical spring and feeding the substance down the chutes, a guide for the reception of the substance from the scale pan, a pawl for maintaining the larger shutter in its closed position by engaging in a ratchet wheel a lever operating said pawl and carried by the scale pan for releasing said pawl from the ratchet wheel when the scale pan returns to its initial position.

In testimony that I claim the foregoing I have hereunto set my hand this 1st day of November, 1893.

CHARLES R. GORRINGE.

Witnesses:
J. FLEMING,
E. EATON.